United States Patent
Khalil

(10) Patent No.: US 12,397,934 B2
(45) Date of Patent: Aug. 26, 2025

(54) NUCLEAR-BASED HEAT AND POWER FOR LOW-EARTH ORBIT (LEO) AND DEEP SPACE MISSIONS

(71) Applicant: Hamilton Sundstrand Space Systems International, Inc., Windsor Locks, CT (US)

(72) Inventor: Yehia F. Khalil, Glastonbury, CT (US)

(73) Assignee: HAMILTON SUNDSTRAND SPACE SYSTEMS INTERNATIONAL, INC., Windsor Locks, CT (US)

(*) Notice: Subject to any disclaimer, the term of this patent is extended or adjusted under 35 U.S.C. 154(b) by 274 days.

(21) Appl. No.: 17/944,861

(22) Filed: Sep. 14, 2022

(65) Prior Publication Data
US 2024/0239520 A1 Jul. 18, 2024

(51) Int. Cl.
  B64G 1/42 (2006.01)
  B64G 1/58 (2006.01)
  G21C 15/02 (2006.01)
  G21D 7/04 (2006.01)

(52) U.S. Cl.
  CPC ............... *B64G 1/422* (2013.01); *B64G 1/58* (2013.01); *G21C 15/02* (2013.01); *G21D 7/04* (2013.01)

(58) Field of Classification Search
  CPC .......... B64G 1/422; B64G 1/58; G21C 15/02; G21D 7/04; G21D 5/02; Y02E 30/30; G21H 1/00
  See application file for complete search history.

(56) References Cited

U.S. PATENT DOCUMENTS

| | | | |
|---|---|---|---|
| 3,524,772 A | 8/1970 | Purdy | |
| 3,621,261 A * | 11/1971 | Princiotta | G21G 4/06 250/493.1 |
| 3,625,279 A | 12/1971 | Mayo | |
| 3,666,566 A | 5/1972 | Paine | |
| 3,716,099 A * | 2/1973 | Deschamps | F28F 13/06 165/135 |
| 3,833,428 A | 9/1974 | Snyder et al. | |
| 3,945,854 A | 3/1976 | Alais | |
| 6,365,822 B1 | 4/2002 | Dobry, Jr. et al. | |
| 9,404,440 B1 | 8/2016 | Reyes et al. | |
| 9,881,709 B2 | 1/2018 | Beach et al. | |
| 2022/0037047 A1 | 2/2022 | Dempsey | |
| 2022/0077371 A1* | 3/2022 | Howe | G21C 1/04 |
| 2022/0139582 A1* | 5/2022 | Levinsky | G21C 5/02 376/267 |

FOREIGN PATENT DOCUMENTS

| | | |
|---|---|---|
| WO | 2010033927 A1 | 3/2010 |
| WO | 2021067901 A1 | 4/2021 |

OTHER PUBLICATIONS

Extended European Search Report, Issued Jan. 3, 2024, EP Application No. 23197487.4-121, 8 Pages.

* cited by examiner

Primary Examiner — Valentina Xavier
(74) Attorney, Agent, or Firm — CANTOR COLBURN LLP

(57) ABSTRACT

A system includes a nuclear reactor having a plurality of fuel rods of radioactive decay material distributed within and embedded within a heat exchange matrix. A plurality of coolant tubes is distributed within and embedded within the heat exchange matrix, interspersed with the plurality of fuel rods. The heat exchange matrix is configured to conduct heat from the fuel rods to the coolant tubes.

11 Claims, 4 Drawing Sheets

| Radioisotope material (fuel rods) | Radiation emitted from isotope radioactive decay | Radioisotope half-life ($t_{1/2}$) | Specific Power, $W_{th}/g$ & (melting point, °C) | Density of radioisotope (g/cc) |
|---|---|---|---|---|
| Curium 242 $Cm^{242}$ | ($\alpha$, $\gamma$) Main emission: $\alpha$ | ≈ 163 days | 120 $W_{th}/g$ (1950 °C) | 13.51 |
| Curium 244 $Cm^{244}$ | ($\alpha$, $\gamma$) Main emission: $\alpha$ | 18.1 years | 2.84 $W_{th}/g$ (950 °C) | 13.51 |
| Cobalt 60 $Co^{60}$ | ($\beta$, $\gamma$) Main emission: $\beta$ | 5.27 years | 17.70 $W_{th}/g$ (1,480 °C) | 8.8 |
| Ruthenium 106 $Ru^{106}$ | ($\beta$) Main emission: $\beta$ | 1 year | 33.10 $W_{th}/g$ (2,310 °C) | 12.37 |
| Cerium 144 $Ce^{144}$ | ($\beta$, $\gamma$) Main emission: $\beta$ | 284.4 years | 25.60 $W_{th}/g$ (1690 °C) | 6.7 |
| Polonium 210 | ($\alpha$, $\gamma$) Main emission: $\alpha$ | 136.4 days | 141 $W_{th}/g$ (254 °C) | 9.2 |
| Thulium 170 $Tm^{170}$ | ($\beta$, $\gamma$) Main emission: $\beta$ | 129 days | 13.2 $W_{th}/g$ (2,375 °C) | 9.32 |

Candidate radioisotopes for the nuclear heat generator (NHG).

Fig. 4

NUCLEAR-BASED HEAT AND POWER FOR LOW-EARTH ORBIT (LEO) AND DEEP SPACE MISSIONS

BACKGROUND

1. Field

The present disclosure relates to long service-life power sources, and more particularly to nuclear-based heat and power sources such as for low-earth orbit (LEO) and deep space missions.

2. Description of Related Art

Deep-space missions and low earth orbit (LEO) missions require long-term supplies of heat and electric power. Heat is needed to support the endothermic reactions such as Sabatier reactions, regeneration, and the like. Electricity is required for power electronic devices carried onboard spacecraft and space-borne devices such as satellites.

The conventional techniques have been considered satisfactory for their intended purpose. However, there is an ever-present need for improved systems and methods for powering spacecraft and space-borne devices. This disclosure provides a solution for this need.

SUMMARY

A system includes a nuclear reactor having a plurality of fuel rods of radioactive decay material distributed within and embedded within a heat exchange matrix. A plurality of coolant tubes are distributed within and embedded within the heat exchange matrix, interspersed with the plurality of fuel rods. The heat exchange matrix is configured to conduct heat from the fuel rods to the coolant tubes.

The heat exchange matrix can be of graphite. The nuclear reactor can be cylindrical defining an axis, wherein the plurality of fuel rods and the plurality of the cooling tubes are aligned with the axis.

An inner shroud can house the plurality of fuel rods, the plurality of coolant tubes, and the heat exchange matrix. A plurality of structural supports can extend outward from the inner shroud. An outer shroud can be connected to the plurality of structural supports for supporting the inner shroud within the outer shroud. Thermal insulation material can fill or can be seated in pockets defined between the inner and outer shrouds. An outer radiation shield can line an outer surface of the outer shroud. Zirconia clad tubing can line between each of the fuel rods and the heat exchange matrix.

A first one of the cooling tubes can be an inlet tube that communicates out of the reactor for passage of coolant outside the reactor into the reactor. A second one of the cooling tubes can be an outlet tube that communicates out of the reactor for passage of coolant inside the reactor out of the reactor. A thermoelectric generator (TEG) can be in fluid communication with the outlet tube for receiving coolant from the reactor and in fluid communication with the inlet tube for return of coolant to the reactor. The TEG can be configured to convert heat energy from coolant from the reactor into electrical power. A pump in the inlet tube or the outlet tube can be included for driving a flow of coolant through the coolant tubes and TEG. A battery can be electrically connected to the TEG to charge the battery. The pump can be electrically connected to the battery for powering the pump. Coolant can be included in a closed circuit within the plurality of coolant tubes in the reactor and TEG.

A crewed or uncrewed spacecraft can be included as part of the system. The spacecraft can include at least one power electronics system connected to the battery for electrical power, and at least one heat dependent system in thermal communication with at least one of the inlet and outlet tubes for heating.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4 is a list of candidate radioisotopes, and their properties, for the nuclear heat generator (NHG).

DETAILED DESCRIPTION OF THE PREFERRED EMBODIMENTS

Figure 1:
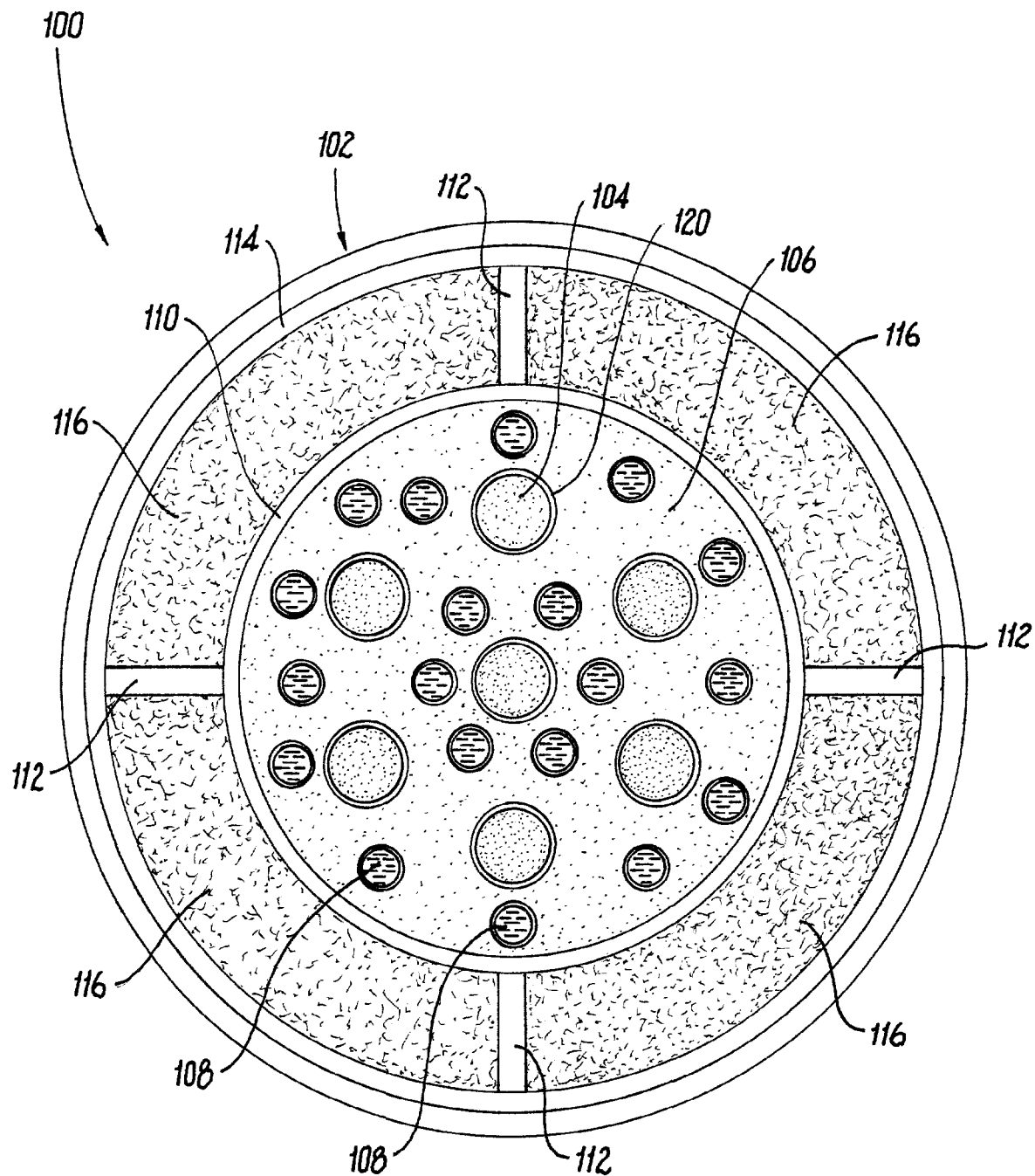
FIG. 1 is a schematic cross-sectional end elevation view of an embodiment of a system constructed in accordance with the present disclosure, showing the reactor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide heat and electrical power to spacecraft such as used for long term missions, low-earth orbit (LEO), and deep space missions such as to the Moon, Mars, and beyond.

The system 100 includes a nuclear reactor 102 having a plurality of fuel rods 104 of radioactive decay material, e.g., with a half-life selected for the desired duration of the intended spacecraft mission. The fuel rods 104 are distributed within and embedded within a heat exchange matrix 106. A plurality of coolant tubes 108, e.g., of stainless steel, are distributed within and embedded within the heat exchange matrix 106, interspersed with the plurality of fuel rods 104. The fuel rods (see FIG. 4 for different types of radioactive isotopes that could be used in the reactor 102) are tubes made of zirconium dioxide (ZrO2), called zircalloy, which houses the radioactive material. As shown in FIG. 4, the radioactive isotope material is typically used in an oxide form (i.e., ceramic material) with a higher melting point compared to the metal itself. For example, $Cm_2{}^{244}O_2$ has melting point of 3,956° F. (≈2,000° C.), density of 9 g/cc, and specific power of 2.27 $W_{th}$/g. The heat exchange matrix 106 is of a graphite material, or any other suitable material configured to conduct heat from the fuel rods 104 to the coolant tubes 108.

An inner cylindrical shroud 110, e.g., of stainless steel, houses the plurality of fuel rods 104, the plurality of coolant tubes 108, and the heat exchange matrix 106. A plurality of structural supports 112, e.g., also of stainless steel, extend outward from the inner shroud 110. An outer cylindrical shroud 114, e.g., also of stainless steel, is connected to the plurality of structural supports 112 for supporting the inner shroud 110 within the outer shroud 114. Thermal insulation material 116, e.g., of $Al_2O_3$, MgO, or the like, fills or is seated in pockets defined radially between the inner and outer shrouds 110, 114, wherein the pockets are circumferentially between adjacent pairs of the structural supports 112. The insulation material 116 resists heat losses out of the inner core 110. An outer radiation shield 118, e.g. of lead, lines an outer surface of the outer shroud 114. Zirconia ($ZrO_2$) clad tubing 120 lines between each of the fuel rods 104 and the heat exchange matrix 106.

Figure 2:
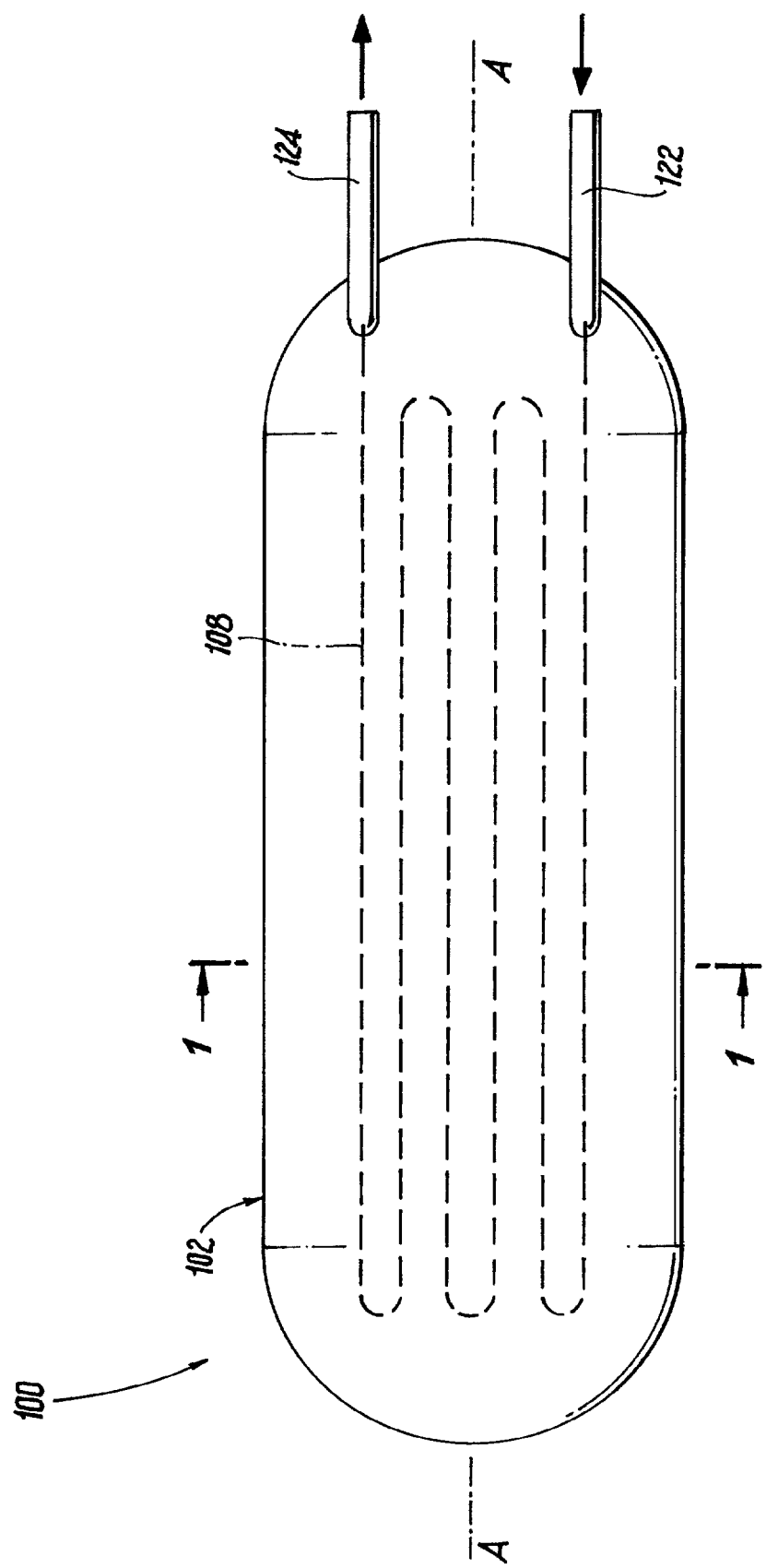
FIG. 2 is a schematic side elevation view of the system of FIG. 1, showing the axis of the cylinder defined by the reactor.

With reference now to FIG. 2, the nuclear reactor 102 is cylindrical defining a cylinder axis A. The plurality of fuel rods 104 and the plurality of the cooling tubes 108 are aligned parallel with the axis A. For sake of clarity in the drawings, the fuel rods 104 are not shown in FIG. 2, but they can be coextensive in the axial direction with the cooling tubes 108. A first one of the cooling tubes is an inlet tube 122 that communicates out of the reactor 102 for passage of coolant outside the reactor 102 flowing into the reactor 102. A second one of the cooling tubes is an outlet tube 124 that communicates out of the reactor 102 for passage of coolant inside the reactor 102 flowing out of the reactor 102. The other coolant tubes 108 can be interconnected for flow through the reactor 102 between the inlet tube 122 and the outlet tube 124.

Figure 3:
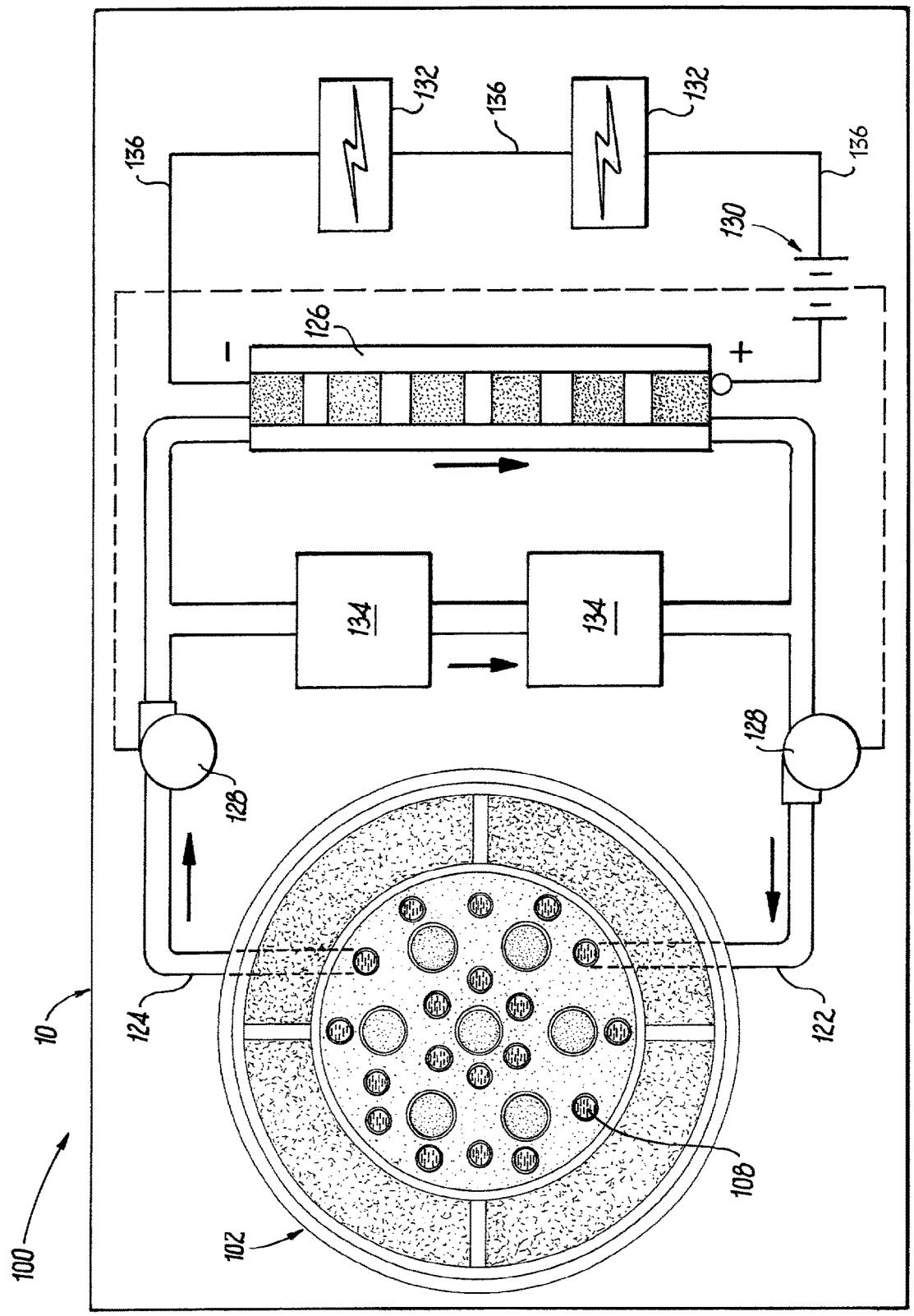
FIG. 3 is a schematic view of the system of FIG. 1, showing spacecraft systems operatively connected to the reactor for heat and electrical power.

With reference now to FIG. 3, a thermoelectric generator (TEG) 126 is in fluid communication with the outlet tube 124 for receiving heated coolant from the reactor 102 and in fluid communication with the inlet tube 122 for return of cooled coolant to the reactor 102. The TEG is configured to convert heat energy from coolant from the reactor 102 into electrical power. A pump 128 is included in the inlet tube 122 and/or the outlet tube 124 for circulating a flow of coolant, i.e., heat transfer medium, through the coolant tubes 108 and TEG 126. A battery 130 is electrically connected, e.g. in electrical line 136, to the TEG 126 to charge the battery 130 with electrical power from the TEG 126. The pump(s) 128 is/are electrically connected, as indicated by the dashed lines in FIG. 3) to the battery 130 for powering the pump(s) 128. Coolant, such as helium gas (He), carbon dioxide gas ($CO_2$), or liquid, is in a closed circuit within the plurality of coolant tubes 108 in the reactor 102 and TEG 126.

A manned or unmanned spacecraft 10 is included. The spacecraft 10 includes at least one power electronics system 132 connected to the battery 130, e.g. by electrical line 136, for electrical power. At least one heat dependent system 134 of the spacecraft 10 is/are in thermal communication with at least one of the inlet and outlet tubes 124, 122 for heating. Heat dependent systems 134 can include a Sabatier reactor which combines $H_2$ and $CO_2$ to produce $H_2O$ and Methane ($CH_4$), which methane can thermally decompose to $H_2$ and solid carbon powder. They can also include any other suitable devices, such as devices to regenerate solid thermal amine scrubbers (TAS), and the like.

Potential benefits are now described. Systems and methods as disclosed herein integrate a nuclear heat generator (NHG) with a thermoelectric generator (TEG) to provide long-term heat and electricity for spacecraft designed for long-term missions in deep space or low-earth orbit (LEO). The nuclear fuel type can be tailored to the mission, e.g. by matching a suitable half-life ($t_{1/2}$) to the anticipated mission duration.

The methods and systems of the present disclosure, as described above and shown in the drawings, provide for heat and electrical power to spacecraft such as those used for long term missions, low-earth orbit, and deep space. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
  a nuclear reactor comprising:
    a plurality of fuel rods of radioactive decay material distributed within and
    embedded within a heat exchange matrix;
    a plurality of coolant tubes distributed within and embedded within the heat exchange matrix, interspersed with the plurality of fuel rods, wherein the heat exchange matrix is configured to conduct heat from the fuel rods to the coolant tubes, wherein a first one of the cooling tubes is an inlet tube that communicates out of the reactor for passage of coolant outside the reactor into the reactor, wherein a second one of the cooling tubes is an outlet tube that communicates out of the reactor for passage of coolant inside the reactor out of the reactor;
  wherein the nuclear reactor is cylindrical defining an axis, and wherein the plurality of fuel rods and the plurality of the cooling tubes are aligned with the axis;
  a thermoelectric generator (TEG) in fluid communication with the outlet tube for receiving coolant from the reactor and in fluid communication with the inlet tube for return of coolant to the reactor, wherein the TEG is configured to convert heat energy from coolant from the reactor into electrical power;
  a pump in the inlet tube and/or the outlet tube for driving a flow of coolant through the coolant tubes and TEG;
  a battery (130) electrically connected to the TEG to charge the battery, wherein the pump is electrically connected to the battery for powering the pump;
  coolant in a closed circuit within the plurality of coolant tubes in the reactor and TEG;
  at least one power electronics system connected to the battery to receive electrical power from the battery; and
  at least one heat dependent system in thermal communication with at least one of the inlet and outlet tubes for heating the heat dependent system.

2. The system as recited in claim 1, wherein the heat exchange matrix is of graphite.

3. The system as recited in claim 1, further comprising an inner shroud housing the plurality of fuel rods, the plurality of coolant tubes, and the heat exchange matrix.

4. The system as recited in claim 3, further comprising a plurality of structural supports extending outward from the inner shroud.

5. The system as recited in claim 4, further comprising an outer shroud connected to the plurality of structural supports for supporting the inner shroud within the outer shroud.

6. The system as recited in claim 5, further comprising thermal insulation material filling pockets defined between the inner and outer shrouds.

7. The system as recited in claim 6, further comprising an outer radiation shield lining an outer surface of the outer shroud.

8. The system as recited in claim 7, further comprising Zirconia clad tubing lining between each of the fuel rods and the heat exchange matrix.

9. A spacecraft comprising:

a system as claimed in claim 1.

10. The spacecraft of claim 9, wherein the spacecraft is a manned spacecraft.

11. The spacecraft of claim 9, wherein the spacecraft is an un-manned spacecraft.

* * * * *